Jan. 18, 1966 M. THOME 3,229,334
CORNER OR BUTT JOINT
Filed Dec. 27, 1962 7 Sheets-Sheet 2
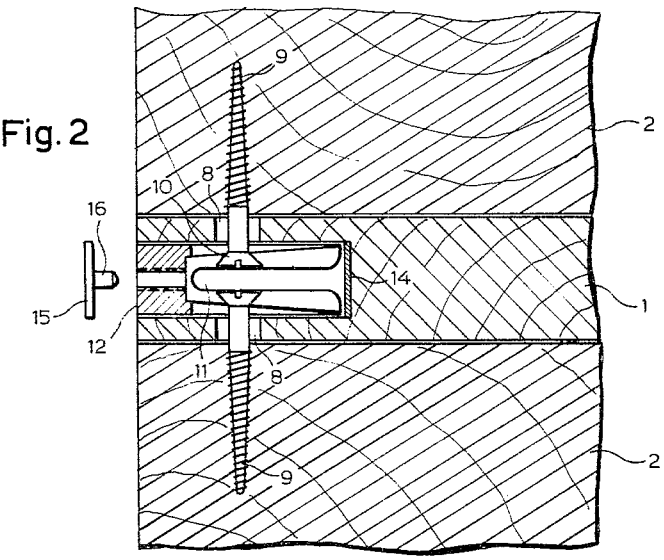
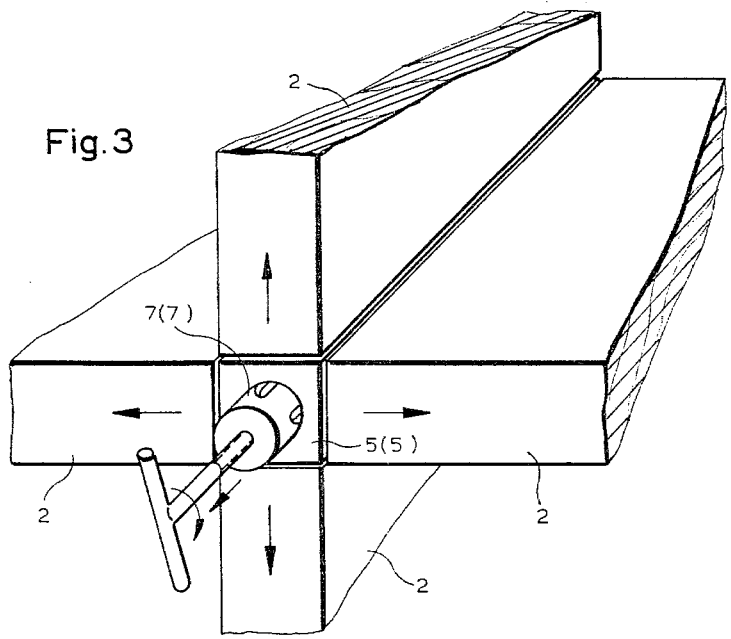
INVENTOR.
BY Jan. 18, 1966 M. THOME 3,229,334
CORNER OR BUTT JOINT
Filed Dec. 27, 1962 7 Sheets-Sheet 3

INVENTOR.
BY *Manfred Thome*

Jan. 18, 1966 M. THOME 3,229,334
CORNER OR BUTT JOINT
Filed Dec. 27, 1962 7 Sheets-Sheet 5

INVENTOR.
BY Manfred Thome

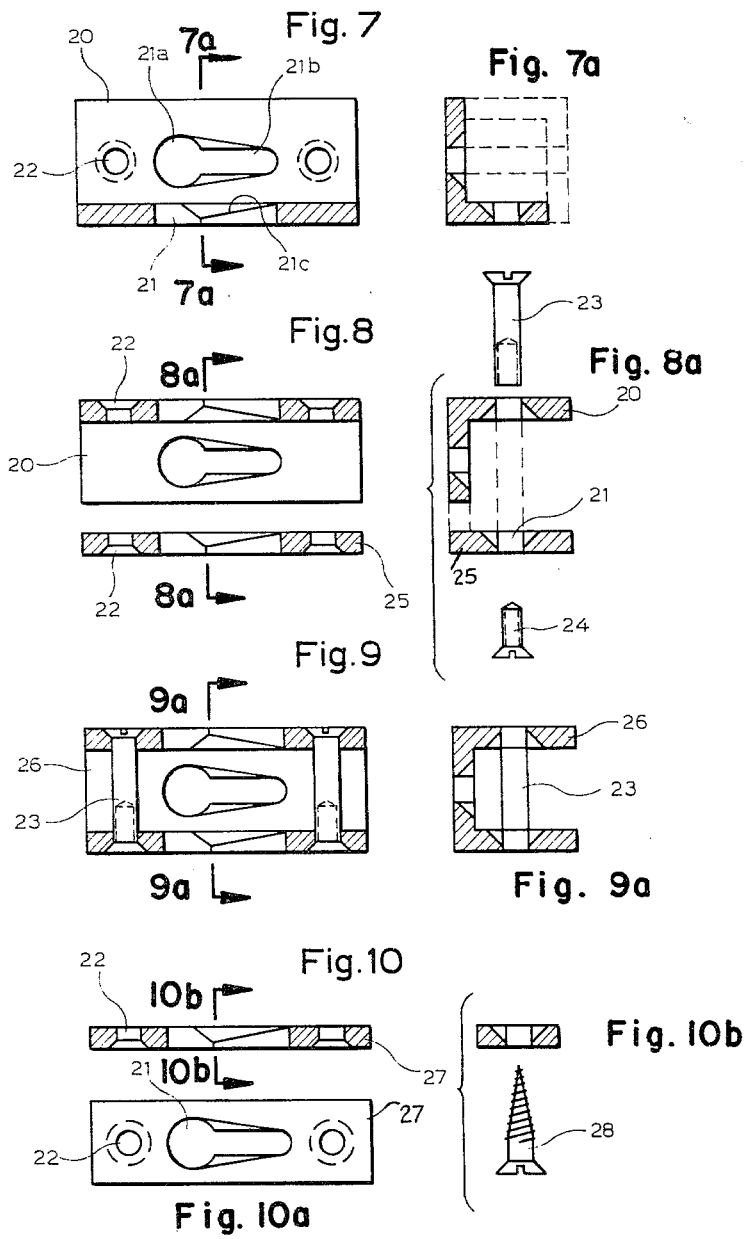

INVENTOR.

BY

United States Patent Office 3,229,334
Patented Jan. 18, 1966

3,229,334
CORNER OR BUTT JOINT
Manfred Thome, Karlsruhe, Germany, assignor to Gebruder Thome Kommanditgesellschaft, Mobelfabrik, Baden, Germany
Filed Dec. 27, 1962, Ser. No. 247,627
Claims priority, application Germany, Dec. 30, 1961, T 21,357; Nov. 8, 1962, T 22,986
15 Claims. (Cl. 20—92)

The present invention relates to a corner or butt joint, primarily for securing flat structural components to each other, such as the top, bottom, or side walls or partitions of furniture items, shipping boxes, or other commodities which are adapted to be easily assembled and disassembled.

In compliance with public demand, the furniture industry has in recent years turned extensively to the production of furniture items which may be easily assembled of standard parts and extensively varied to comply with different wishes or requirements as to the shape and purpose of the particular article. This means that pieces of furniture such as wardrobes, chests of drawers, dressers, shelves, and many other articles are no longer manufactured as finished units which, if they are to be enlarged or combined with each other, can only be placed adjacent to or on top of each other, but that they are made of a plurality of individual elements, such as top, bottom, and side walls and partitions, which may be easily attached to each other like the parts of a toy construction box to form a skeleton into which shelves, compartments, drawers, doors, sliding windows, and the like may thereafter be installed. In this manner it is possible to assemble a multitude of different furniture units and combinations of any desired sizes which may even be so large as to take up an entire wall of a room.

Further very important advantages of furniture items which are made of individual parts of standard sizes and which may be assembled like the pieces of a construction box consist in the considerable savings which can be made in the manufacture, transportation and assembly of such items. Thus, for example, even very large furniture combinations may be packed and shipped while disassembled into their individual components which then require very little space. Since the work of assembling the individual components requires no particular knowledge or training, it may be carried out by almost any layman, for example, the purchaser himself who will thus save the considerable difference in the cost between the individual parts and a finished piece of furniture. In order to permit the individual furniture components to be applied as universally as possible, the individual boards and the like are generally made of a uniform width which is equal to the depth of the assembled piece. The length of the boards is generally limited to a few standard sizes and may be, for example, in accordance with the width or height of a normal wardrobe. Usually there are boards provided of two or three intermediate lengths to permit the number of combinations to be increased in accordance with different wishes or architectural requirements.

One considerable difficulty in the production and assembly of furniture and other commodities which are made of prefabricated parts has in the past consisted in the lack of suitable means for attaining a corner or butt joint which permits adjacent boards to be easily and securely connected to each other in a manner so that the joint has a solidity and tightness equal to a glued joint and the mechanical parts of the joint are not visible from the outside or at least do not affect the appearance of the piece of furniture.

It is an object of the present invention to overcome these prior difficulties and to improve the quality, solidity, and appearance of furniture items and other commodities which may be easily assembled of prefabricated parts according to the construction box principle by providing a new type of corner or butt joint for connecting individual boards or similar parts to each other in a manner so that the joint resembles a glued joint insofar as its solidity, tightness, static loading capacity, and outer appearance are concerned, while having the additional advantage of being easily assembled and disassembled.

A further object of the invention is to provide a new type of joint especially for furniture parts, for example, the top, bottom and side walls and intermediate partitions of wardrobes, chests of drawers, shelves, and the like, but also of shipping boxes and many other commodities, which joint may be applied whenever the abutting parts are disposed in alignment with or at right angles to each other and which consists of suitable connecting elements which may be either installed in a separate connecting bar or also directly in one of the furniture parts so that no additional connecting bar or the like will be required.

For attaining the aforementioned objects, the invention relies upon the principle of a corner connecting bar of a conventional type which is manufactured as a separate item and provided with apertures in its side walls into which the heads of wood screws or the like may be inserted which are located near the front and rear sides of the piece of furniture and are screwed into the corner surfaces of the furniture parts which are to be connected to each other. Based upon such a connecting bar, the invention consists in providing the connecting bar with a longitudinal bore in at least one of its ends into which, through transverse bores in the bar, the screwheads are inserted which project from the edge surfaces of the furniture parts to be connected, and in providing at least one tubular connecting socket which has a plurality of longitudinal slots which are open at one end and the opposite walls of which form wedge-shaped surfaces which, when the socket is being driven into the longitudinal bore in the connecting bar, slide behind the screwheads, which are tapered on the side facing their shafts, and then draw them toward the axis of the connecting bar, whereby the respective furniture part or parts will be drawn tightly against the connecting bar.

The invention is not limited to any particular location of the longitudinal bore for receiving the connecting socket or to the use of a separate connecting bar. This bore may be provided either in one end of such a separate connecting bar or in the edge portion of one of the furniture parts to be connected to each other or even in a part between the ends of a furniture part. The invention is also not limited to any particular number of furniture or other parts to be connected to each other or to any particular angle at which these parts have to be disposed relative to each other.

The longitudinal bore in the connecting bar or furniture part into which the connecting socket is to be driven is preferably made of such a depth that, when the socket is driven into it to the depth at which the furniture part or parts carrying the connecting screws firmly abut against the connecting bar or furniture part carrying the socket, this socket is completely inserted into this bar or furniture part. On the bottom of this longitudinal bore a small metal plate may be secured which serves as an abutment for the socket and also for a threaded tool which may be screwed into and through the bottom of the socket and against the metal plate for removing the socket from the longitudinal bore.

The connecting socket according to the invention is preferably cup-shaped and its inner wall is preferably tapered toward the bottom of the socket so that the opposite walls of the longitudinal slots therein which are disposed at an angle of 90° to each other ase likewise tapered and of a wedgelike shape from their open ends to a point near the bottom of the socket. It is further important that the width of these slots is smaller than the diameter of the screwheads and larger than the diameter of the shafts of the wood screws which project from the edge surfaces of the furniture parts to be connected. When the connecting socket is being driven into the longitudinal bore, the tapered lower parts of the screws slide along the inclined planes of the slot edges and are thereby drawn toward the axis of the socket. As already indicated, the bottom of the socket is provided with a tapped hole into which a threaded tool may be screwed when the socket is to be removed during a disassembly of the piece of furniture.

According to another embodiment of the invention the connecting socket has a cylindrical inner wall. The longitudinal slots in the socket wall which again are disposed at an angle of 90° to each other taper at an acute angle from their open ends toward the bottom of the socket. The wood screws or the like which project from the edge surfaces of the furniture parts to be connected should then be tapered at a wide angle at the side facing the screw shafts so as to produce the necessary traction in cooperation with the wedge-shaped slot walls to draw the furniture parts tightly against the connecting bar or against each other when the connecting socket is being driven into the longitudinal bore. The bottom of the socket is again provided with a tapped bore to permit it to be removed by means of a threaded tool.

When the piece of furniture has been assembled, it is advisable to close and cover each of the connecting sockets by means of a cap which has a smooth pin projecting therefrom which has a diameter equal to the inner diameter of the tapped hole in the bottom of the socket so that it may be pressed into the tapped hole.

According to one preferred embodiment of the invention the furniture parts are secured to each other by means of two connecting sockets which exert a wedging action in opposite directions to each other when they are driven into coaxial longitudinal bores in the opposite ends of the connecting bar or of one of the furniture parts.

Although the provision of two opposite movable connecting sockets complies with all of the requirements for securely and tightly connecting several furniture parts to each other, it has been found in actual practice that further considerable advantages may be attained if one of the two connecting members is made immovable and mounted in a fixed position on the connecting bar or one of the furniture parts, while the other connecting member, i.e., the connecting socket, is movable.

According to this modification of the invention, the connecting bar or one of the furniture parts is provided in one end with a movable connecting socket as previously described and near its opposite end with a slotted fitting which is secured to the lateral sides of the connecting bar or furniture part and provided with wedge-shaped slots which extend in the opposite direction to the wedge-shaped slots in the movable socket and are in alignment with the longitudinal bore into which the socket is inserted and thus also with the longitudinal slots in the socket.

A practical advantage of this combination of the movable wedge-shaped surfaces of the connecting socket with the fixed wedge-shaped surfaces of the slotted fitting is the fact that, if in the assembly of a piece of furniture the connecting socket is inserted from the front side and the slotted fitting is mounted at the rear side of the furniture piece, it is possible to carry out the assembly directly on the wall of a room where the furniture piece is to remain since there are no manipulations which have to be carried out for its assembly from the rear thereof. This constitutes a considerable advantage especially if the piece of furniture to be assembled should have a size so as to take up an entire wall of a room and abut tightly against the two adjacent side walls, since it is in such a case very difficult or even impossible to move the completely assembled furniture piece against the wall. If, on the other hand, the position of the two connecting members is reversed so that the slotted fitting is mounted at the front side and the movable socket at the rear side of the furniture piece, the advantage is attained that the type of connection cannot be recognized since all connecting members are either covered by the abutting surfaces of the furniture parts or those which might be visible are located at the rear of the furniture piece. If one of two connecting members consists of a slotted fitting as above described, it will facilitate the assembly of the furniture piece in either of the two mentioned positions of these members if prior to the insertion of the connecting socket the furniture parts can be successively hooked into the slots of the slotted fitting and to remain in this position without falling off.

According to a preferred embodiment of the invention, each of the slots in the slotted fittings has a keyhole shape consisting of a bore and a slot connected thereto which is provided with wedge-shaped walls. This bore has a diameter substantially equal to the diameter of the head of a wood screw which projects from the edge surface of one of the furniture parts and is to be inserted into this bore, while the slot has a width substantially equal to the diameter of the shaft of the screw.

For connecting a furniture part to a continuous side wall, the slotted fitting may consist of a single flat plate with the mentioned keyhole slot and a pair of bores therein. If two furniture parts are to be connected to a continuous wall, two such flat fittings are provided. For an angular connection of furniture parts on three sides, the slotted fitting may either be composed of a flat fitting and an angular fitting or of a single U-shaped fitting in which case the bores for mounting the fitting by means of screws or the like are provided in the two arms of the U.

The slotted fittings are preferably sunk into the surfaces of the connecting bar or of one of the furniture parts near one end thereof so that the upper surfaces of the fitting are in alignment with the surfaces of the connecting bar or furniture part. The screws for securing the fitting to the connecting bar or furniture part either consists of wood screws or preferably of rivetlike pins which are countersunk into the fitting and pass from one side through the fitting and the bar or furniture part and the ends of which are provided with tapped bores into which countersunk screws may be inserted.

The corner or butt joint according to the invention permits the furniture parts which are thereby connected to be drawn concentrically toward each other until they are pressed against each other as tightly as possible. This pressure may be increased up to the ultimate stress limit of the material. Insofar as its solidity and tightness is concerned, the new joint may therefore be compared with a glued joint between wooden bodies. Over such a joint it has, however, the advantage of being easily assembled or separated whenever desired.

The foregoing description of different embodiments of the invention indicates the versatility of its application. It is by no means limited to the construction of furniture but may be applied for innumerable other purposes in which different elements, especially of a flat boardlike shape, are to be removably secured to each other. Thus, for example, shipping boxes for heavy goods, especially for oversea shipping can be built up in a manner similarly as described. For a return shipment of the empty boxes, they may be taken apart and their components be packed within a very small space in the form of small bundles. By means of the invention it is also possible to build up household utensils, such as ladders, vehicle frames, toys, and the like. The connecting elements according to the invention may also form components of toy construction sets.

The above-mentioned as well as still further features and advantages of the present invention will become more clearly apparent from the following detailed description thereof which is to be read with reference to the accompanying drawings in which the application of the invention to the construction of furniture is illustrated merely as an example of the versatility of its application in many different fields.

In the drawings,

FIGURE 2 shows a vertical longitudinal section of the joint according to FIGURE 1 in the assembled condition;

FIGURE 3 shows an isometric perspective view of the same joint in the position while being disassembled;

FIGURE 7 shows a longitudinal section and FIGURE 7a shows a cross section of a slotted fitting as applied in FIGURE 5;

FIGURE 8 shows a longitudinal section and FIGURE 8a shows a cross section of a two-part U-shaped slotted fitting which may be applied, for example, to the embodiment according to FIGURE 6;

FIGURE 9 shows a longitudinal section and FIGURE 9a shows a cross section of a one-piece U-shaped slotted fitting; which may be applied, for example, to the embodiment according to FIGURE 6;

FIGURE 10 shows a cross section and FIGURE 10a shows a bottom view of a flat slotted fitting for an individual joint; FIGURE 10b shows an end cross section taken along line 10b—10b in FIGURE 10 along with a securing member therefor;

FIGURE 13 shows a cross section taken along line XIII—XIII of FIGURE 12; while

Figure 1:
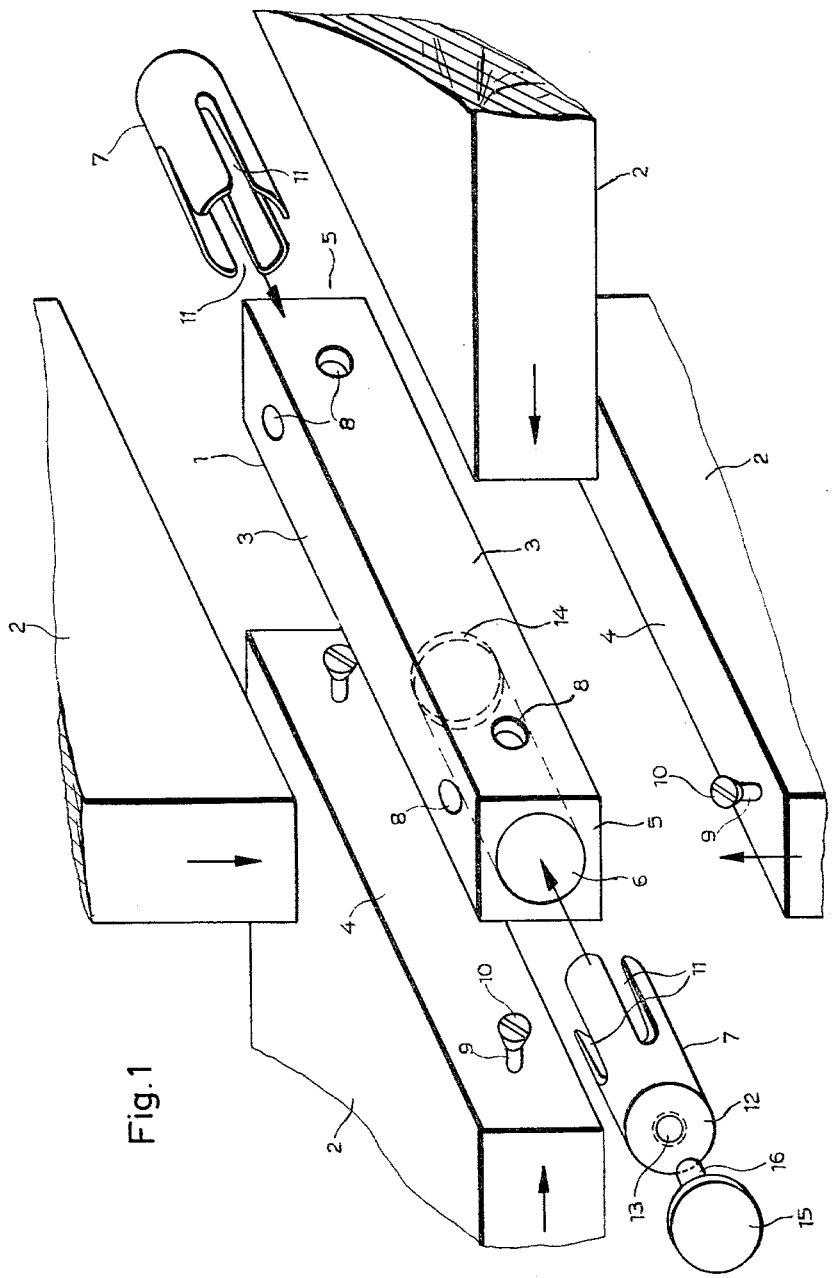
FIGURE 1 shows an isometric perspective exploded view of a butt joint according to the invention between four furiture parts by means of a single connecting bar and two connecting sockets.

Referring to the drawings, and first particularly to FIGURES 1 to 3, the connecting bar 1 has a square cross section and its length is exactly equal to the width of the furniture parts 2 and therefore also equal to the depth of the completely assembled piece of furniture. The height or thickness of the connecting bar 1 is likewise equal or substantially equal to the thickness of the furniture parts 2 so that the lateral surfaces 3 of bar 1 corresponds exactly or at least substantially to the edge surfaces 4 of the parts 2. The end surfaces 5 of the connecting bar contain coaxial longitudinal bores 6, the diameter of which depends upon the thickness of the bar and the physical properties of its material, whereas the depth of these bores 6 corresponds to the length of the sockets 7 which are to be inserted therein. The outer diameter of each socket 7, in turn, depends upon the diameter of bore 6 and is substantially equal thereto. The sides of connecting bar 1 which are to abut against the furniture parts 2 are provided with transverse bores 8 or according to FIGURE 5 with slots 8' which extend up to the longitudinal bores 6. During the assembly of the piece of furniture, these transverse bores or slots 8 or 8' receive the heads 10 of wood screws 9 or the like which are screwed into the edge surfaces 4 of the furniture parts 2, preferably with the aid of a suitable template so that the screwheads 10 which are tapered on the side adjacent to the screw shafts will project uniformly from the edge surfaces 4.

Sockets 7 are cup-shaped and the wall of each socket which on the inner side is tapered toward the bottom 12 is provided with four longitudinal slots 11 which are open at the end of the socket which is inserted into one of the longitudinal bores 6, and they are disposed at an angle of 90° to each other. Slots 11 have a width substantially in accordance with the thickness of the shafts of screws 9 and their sides are wedge-shaped in accordance with the tapered wall of the socket as shown particularly in FIGURE 2. When the sockets 7 are being driven into the longitudinal bores 6, the screwheads 10 are drawn along the wedge-shaped surfaces of the walls of the longitudinal slots 11 until the adjacent surfaces of the furniture parts 2 and bar 1 abut tightly against each other. Sockets 7 reach their final position as soon as their bottoms 12 are in alignment with the end surfaces 5 of connecting bar 1. In order to permit the sockets 7, which are preferably driven into the bores 6 by means of a hammer or the like, to be withdrawn when the respective piece of furniture is being disassembled, the bottom 12 of each socket is provided with a tapped central hole 13 into which the threaded shaft of a suitable tool, as shown, for example, in FIGURE 3, may be screwed until its end engages upon a small metal plate 14 on the bottom of bore 6, whereupon—when this tool is further turned—the socket will move along the threaded stem and will thus be drawn out of bore 6.

After being driven into bore 6, each socket 7 is preferably covered by a cap 15, for example, of plastic, which is provided with a smooth stem 16 of a diameter equal to the inner diameter of the tapped hole 13 into which stem 16 may be pressed.

Figure 4:
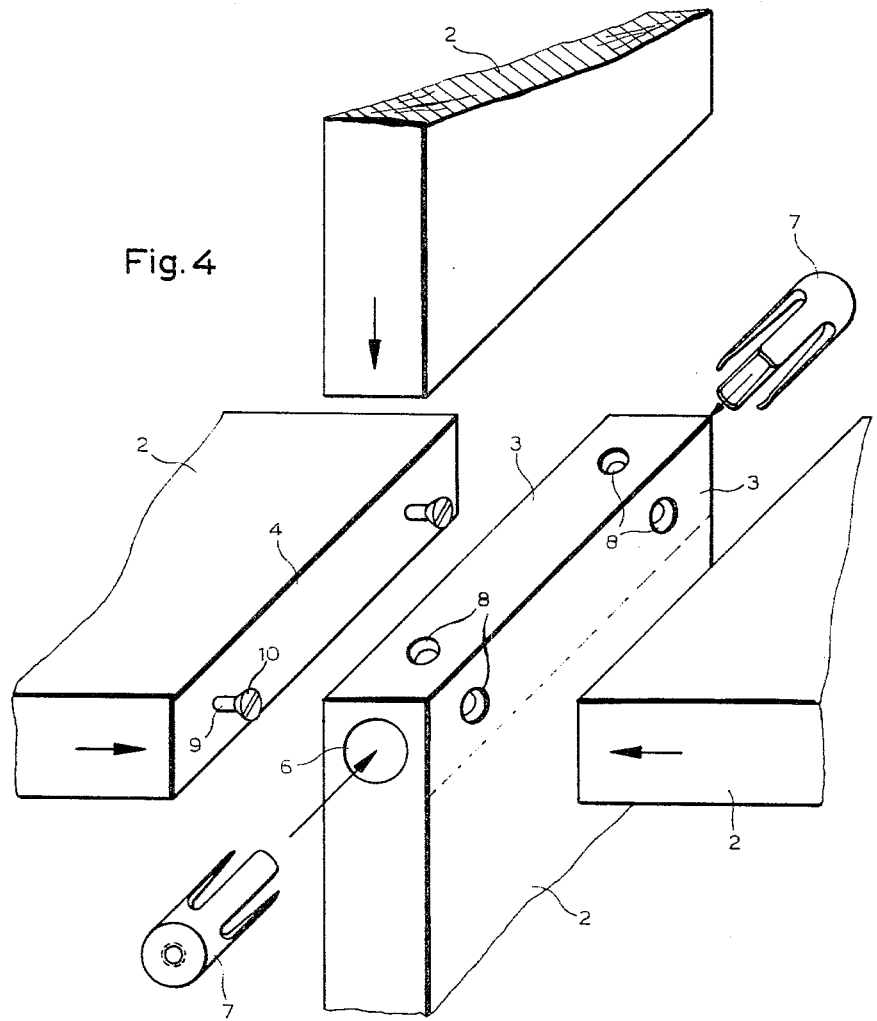
FIGURE 4 shows a view similar to FIGURE 1 of a modification of the invention, in which a separate connecting bar is omitted and one of the furniture parts serves as the support of the connecting sockets.

While according to FIGURES 1 to 3, the four furniture parts 2 are secured to each other by a connecting bar 1, it is also within the concept of the invention, as illustrated in FIGURE 4, to omit such a bar as a separate member by making it an integral part of one of the furniture parts 2 which may thus form butt joints with one, two, or three other furniture parts 2. In all other respects, this modification of the invention according to FIGURE 4 is of the same construction as the embodiment according to FIGURES 1 to 3.

Figure 5:
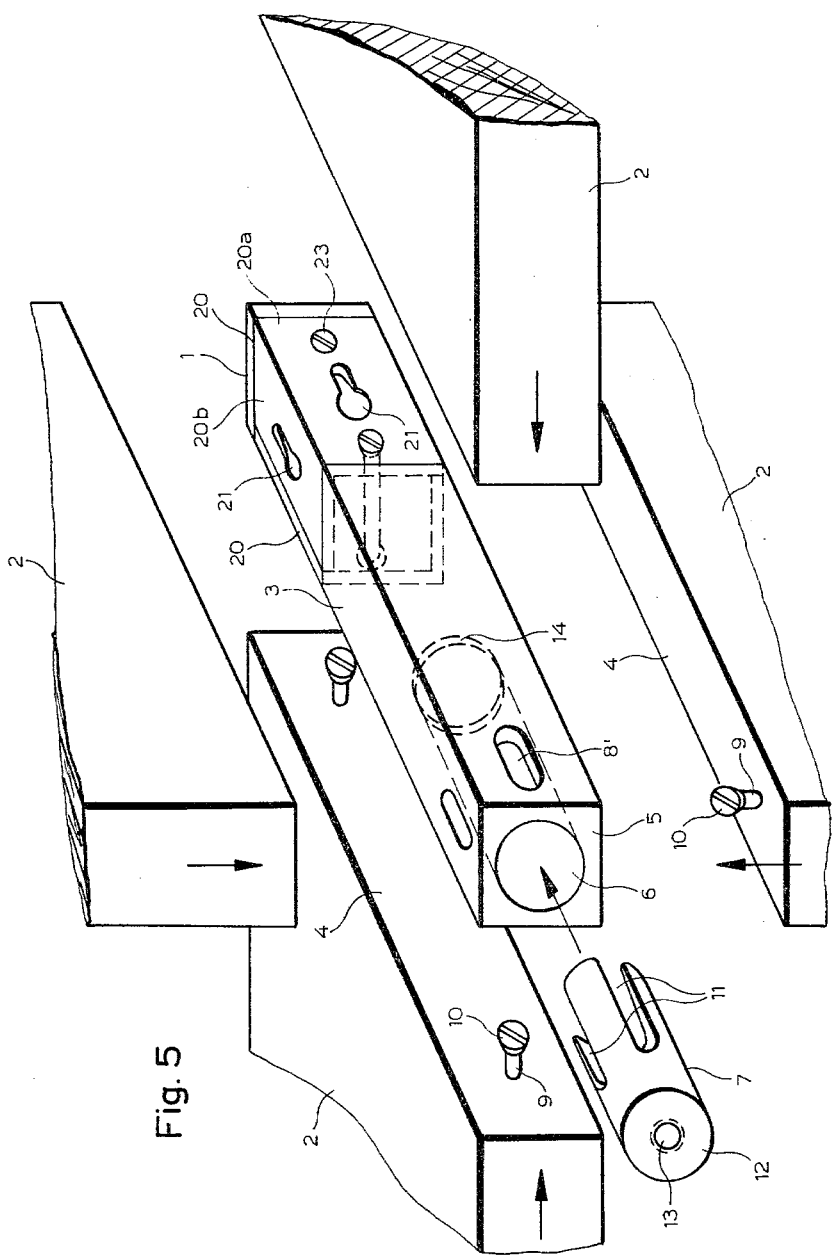
FIGURE 5 shows another view similar to FIGURE 1 of another modification of the invention, in which one of the connecting sockets is replaced by an external slotted fitting.
Figure 6:
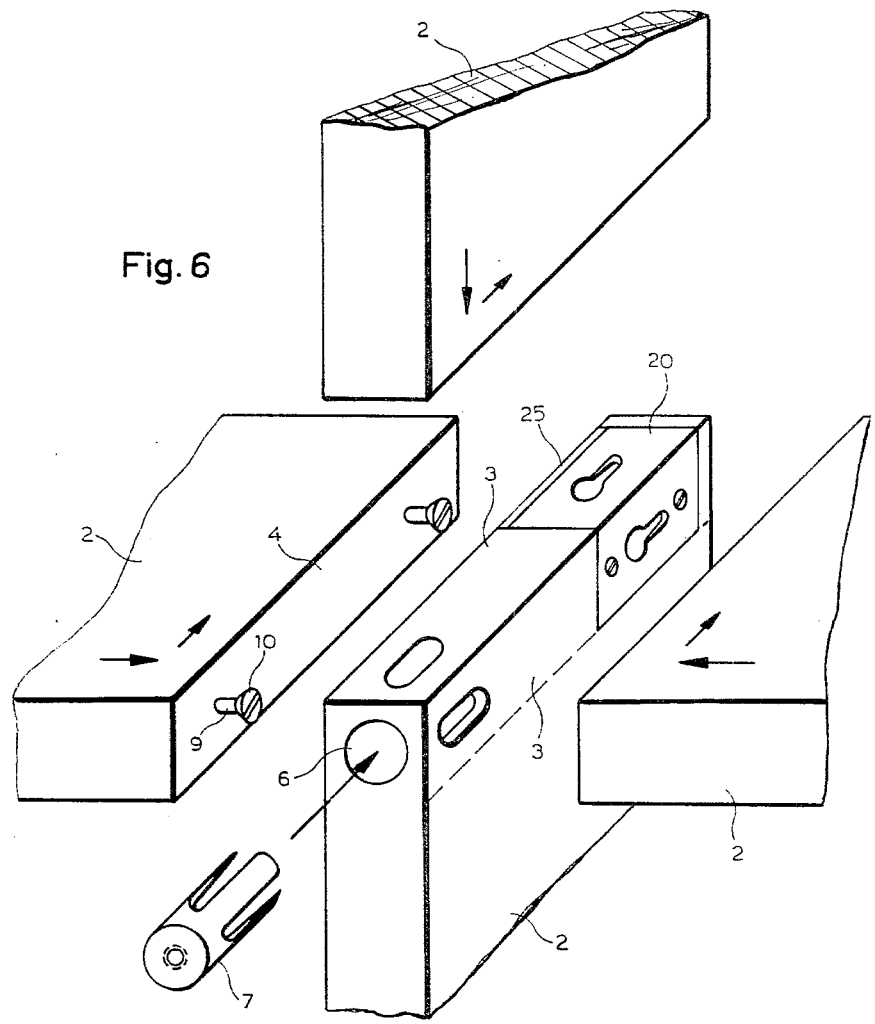
FIGURE 6 shows a similar perspective view of a modification of the joint according to FIGURE 4, but employing an external slotted fitting in combination with a connecting socket.
Figure 11:
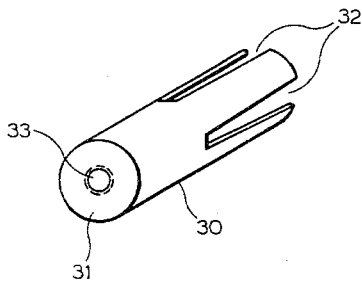
FIGURE 11 shows a perspective view of a modification of the connecting socket according to the invention with a cylindrical inner wall.
Figure 12:
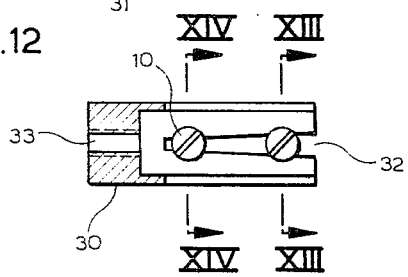
FIGURE 12 shows a longitudinal section thereof.
Figure 13:
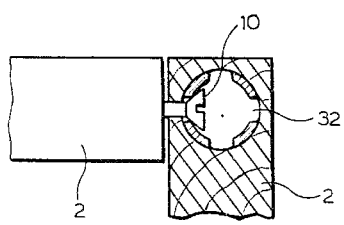
Figure 14:
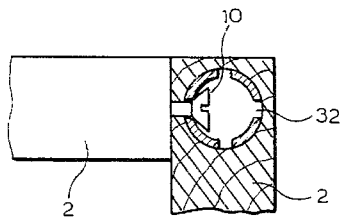
FIGURE 14 shows a cross section taken along line XIV—XIV of FIGURE 12.

According to a further modification of the invention which is illustrated in FIGURE 5 on a connecting bar 1 and in FIGURE 6 on the edge portion of one of the furniture parts 2, it is also possible to replace one of the two opposite conical socket connections of each joint by a slotted fitting which is secured to the outside of the connecting bar or edge portion. Thus, while in FIGURE 5 the front end of connecting bar 1 contains a socket 7 as described with reference to FIGURES 1 to 3, the rear end is provided with a fitting which consists of two angle pieces 20 which are sunk near the rear end surface of bar 1 into the lateral surfaces 3 thereof so that the outer surfaces of members 20 are flush with the adjacent outer surfaces 3 of bar 1. The two sides 20a and 20b of each of these angle pieces 20 have a different width insofar as the side 20b is narrower than the side 20a by the thickness of the material of the fitting. Each side 20a and 20b is provided symmetrically to the longitudinal center line of the respective lateral surface 3 of connecting bar 1 with a keyhole-shaped aperture 21 which consists of a bore 21a and a slot 21b extending in the longitudinal direction of bar 1. Bore 21a has a diameter substantially equal to the diameter of each of the slotted heads of the wood screws 9 in the edge surfaces 4 of the furniture parts 2, while slot 21b has a width substantially equal to the diameter of the shafts of screws 9. The opposite walls 21c of each slot 21b are inclined like a wedge relative to each other similarly to the wedge-shaped surfaces on socket 7 by diverging toward the inner side of the respective angle piece 20 and by also tapering from the end next to bore 21a toward the closed end of the slot. After the slotted heads 10 of screws 9 in one of the furniture parts 2 are inserted into a slot 8' and a bore 21a in one side of bar 5, bar 5 and the respective furniture part 2 are shifted relative to each other to slide the screwhead 10 which is inserted into bore 21a along the wedge-shaped surfaces 21c of slot 21b toward the end of the slot until the furniture part 2 is firmly pressed against the side of bar 5. Thereafter, the connecting socket 7 is driven into bore 6, for example, by means of a hammer so that the other screwhead 10 slides along the wedge-shaped surfaces of slots 11 until this side of the furniture component 2 is also firmly pressed against the side of bar 2. The two angular fitting members 20 are clamped to each other on bar 1 by a pair of screws 23 which extend vertically to the axis of bar 1 through bores 22 in the sides 20a of members 20 and have tapped bores in their ends into which countersunk screws 24 are screwed.

When the piece of furniture is being assembled, attention should be paid that the connecting bar 1 is placed so that the axes of screws 23 extend in the direction of the greater traction and vertically to the compressive forces. In the assembled condition, the connecting elements are covered completely by the furniture parts 2 and only the bottom 12 of socket 7 is visible at one side of the piece of furniture.

The slotted fitting 20 may be provided either at the front or rear side of a piece of furniture. Each of these arrangements has its own advantages. If fitting 20 is located at the front side and socket 7 at the rear, the front end of bar 1 will be plain and no additional means will be required to cover up any fitting. If, on the other hand, the slotted fitting 20 is provided at the rear side of the piece of furniture and socket 7 at the front, the important advantage may be attained that the piece of furniture which may extend, for example, from one wall to the opposite wall of a room may be built up directly in engagement with a third wall on which it is to remain and does not have to be moved against this wall after it has been completely assembled.

FIGURE 6 illustrates the same connecting elements as are shown in FIGURE 5 which, however, similarly as in FIGURE 4, are provided not on a separate connecting bar but directly on one of the furniture parts 2. Thus, there is no need for any additional intermediate connecting bar for securing four boards or the like at right angles to each other. The slotted fitting may in this case either consist of one of the angular fittings 20 as shown in FIGURES 5 and 7 in combination with a flat plate 25 as shown in FIGURE 8, or of a U-shaped fitting 26, as shown in FIGURE 9.

There may be further modifications of the joint according to the invention, for example, in the form of connecting fittings which are to be mounted between the opposite ends of a furniture part 2, for example, for laterally connecting two furniture parts to one continuous wall. For such joints with only two pairs of abutting surfaces, it is possible either to apply two sockets 7 or one socket 7 in combination with two flat fittings 27, as shown in FIGURE 10, which are secured to each other at the opposite sides of a board or wall by means of screws 23 and 24, as shown in FIGURE 8. If there is to be only a single joint, for example, for connecting an edge portion of a partition to a continuous board of a top or bottom wall a socket 7 in combination with only one flat fitting 27 may be used which is secured by a pair of wood screws 28 to the continuous board.

In place of the sockets 7 with tapered inner walls, it is also possible to employ cylindrical sockets 30, as shown in FIGURES 11 to 14, each of which has a coaxial cylindrical bore and is provided with four slots 32 which are disposed at right angles to each other, are open in the direction in which they are inserted, and taper at an acute angle toward the bottom 31. This bottom 31 is again provided with a tapped hole 33 into which a threaded tool may be screwed in the same manner as shown in FIGURE 3 for the purpose of removing the socket from the longitudinal bore in the connecting bar or in one of the furniture parts 2. If such a cylindrical socket 30 is employed, it is absolutely necessary that the heads of the wood screws 9 which project from the edge surfaces 4 of the furniture parts 2 are conical on their sides adjacent to the screw shafts. The open end of each slot 32 has a width slightly smaller than the maximum diameter of screwheads 10 and the inner end of the slots has a width substantiallly equal to the diameter of the shafts of screws 9. When socket 30 is being driven into the bore in a connecting bar or in a furniture part 2, the conical screwheads 10 riding along the tapered slot 32 are drawn toward the axis of the bore, whereby the two furniture parts are tightly pressed against each other.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claims is:

1. A corner or butt joint for removably securing structural parts and permitting the same to be easily assembled and disassembled comprising:
   a plurality of structural parts,
   a plurality of shafts having heads tapered on the side thereof facing said shafts, said shafts being mounted in said structural parts with said heads projecting a predetermined uniform distance from said parts,
   connecting means for securing said structural parts by firmly engaging said shafts including a connecting element having at least one longitudinal bore and a plurality of transverse apertures extending into said longitudinal bore and corresponding in size to said heads on said shafts, and tubular socket means mounted tightly within said longitudinal bore for locking said connecting means to said structural parts by firmly engaging the heads on said projecting shafts,
   said structural parts in the assembled position being in tight contact with said connecting means with said projecting shafts inserted with the heads thereof into said transverse apertures and extending into said longitudinal bore.

2. A corner or butt joint for removably securing structural parts and permitting the same to be easily assembled and disassembled, comprising:
   a plurality of structural parts,
   a plurality of shafts having heads tapered on the side thereof facing said shafts, said shafts being mounted in said structural parts with said heads projecting a predetermined uniform distance from said parts from one surface thereof,
   connecting means for securing said structural parts by firmly engaging said shafts including a connecting element having at least one longitudinal bore and transverse apertures extending into said longitudinal bore, and tubular socket means mounted tightly within said longitudinal bore for locking said connecting means to said structural parts,
   said structural parts in the assembled position being in tight contact with said connecting means and having said projecting shafts inserted with the heads thereof into respective ones of said transverse apertures and extending into said longitudinal bore,
   said tubular socket means having a wall portion provided with a plurality of longitudinal slots extending to one edge thereof, each of said slots having a width smaller than the maximum diameter of the heads on said shafts and engaging said shafts beneath said heads in the assembled position, the opposing walls of each slot being tapered to form wedge-shaped surfaces so that longitudinal movement of said socket means in said longitudinal bore provides for increased pressure on the tapered side of the head on each shaft engaged thereby, whereby said shaft is drawn toward the axis of said longitudinal bore until said part carrying said shaft is pressed tightly against said connecting element.

3. A corner or butt joint as defined in claim 2, in which said socket means is tapered on the inside of said wall portion so that each longitudinal wall of said slot in said socket means is also tapered on the inside of said socket means for producing a wedging action on the head when said socket is being driven into said bore.

4. A corner or butt joint as defined in claim 2, in which said socket means is cylindrical in shape, the opposite walls of each of said slots in said socket means being tapered relative to each other at an acute angle toward the end of said socket means including said one edge.

5. A corner or butt joint as defined in claim 2, in which each of the opposite ends of said connecting element has one of said longitudinal bores therein, said bores extending coaxially to each other and dimensioned to receive one of said socket means, each of said socket means engaging with one of said shafts projecting from the same structural part and producing a wedging action in a direction opposite to the wedging action produced by the other socket means.

6. A corner or butt joint as defined in claim 2, in which said connecting element comprises a bar having a substantially square cross section and serving as an intermediate connecting member between several of said parts to be connected.

7. A corner or butt joint as defined in claim 2, in which said connecting element is integral with one of said parts to be connected.

8. A corner or butt joint as defined in claim 2, and further comprising a small metal plate secured to the bottom of said longitudinal bore and serving as an abutment for said socket means, said longitudinal bore and said socket means being essentially of the same overall size and shape.

9. A corner or butt joint as defined in claim 8, in which said socket has a transverse wall portion including a tapped hole centrally located therein for screwing a threaded tool into and through said socket means and thereby facilitating the removal of said socket means from said bore upon contact of said threaded tool with said small metal plate in the bottom of said bore.

10. A corner or butt joint as defined in claim 9, and further comprising a cap having a smooth pin thereon pressed into said tapped hole in said transverse wall portion to cover said socket means.

11. A corner or butt joint as defined in claim 2, in which said longitudinal bore is provided in one end of said connecting element, and further comprising a slotted fitting mounted on and sunk into at least one outer surface of said connecting element near the opposite end thereof from said longitudinal bore with the outer surface of said fitting flush with the adjacent outer surface of said connecting element, said fitting having at least one additional slot having a width at one end thereof substantially equal to the maximum diameter of the head of an additional shaft to be inserted therein and projecting from the part to be connected, said additional slot extending in the same direction as said longitudinal bore and having adjacent to said one end a width smaller than the maximum diameter of said head of said additional shaft, but sufficient to permit the additional shaft to slide along said additional slot in said fitting, said additional slot having opposite walls tapered to form wedge-shaped surfaces similar to those of the slots of said socket means, but tapered in the direction opposite to the taper of the slots of said socket means for producing a wedging action on said head sliding from said hole into said additional slot when the part to be connected is shifted in the direction opposite to the end of said connecting element containing said bore for said socket means, whereby the portion of said part containing said additional shaft is pressed tightly against said connecting element before said socket means is driven into said bore for also pressing the opposite end of said part tightly against said connecting element.

12. A corner or butt joint as defined in claim 11, in which said additional slot in said fitting has a keyhole shape consisting of a hole of a diameter substantially equal to the maximum diameter of said head to be inserted therein and projecting from the part to be connected, and of a longitudinal slot extending from said hole in the same direction as said longitudinal bore and having a width smaller than the maximum diameter of said head but sufficient to permit the shaft portion adjacent to said additional shaft to slide along said additional slot in said fitting.

13. A corner or butt joint as defined in claim 12, in which said fitting comprises an angle piece having one of said keyhole slots in each web and bores in one web for receiving screws for securing said angle piece to an edge portion of said connecting element.

14. A corner or butt joint as defined in claim 12, in which said fitting has a U-shaped cross section having one of said keyhole slots in each of its three webs and bores in the two opposite webs, said fitting embracing said connecting element on three sides thereof.

15. A corner or butt joint as defined in claim 14, further comprising a countersunk rivetlike pin inserted into each of said last bores and passing through said part, said pin having a tapped axial bore in its end, and a countersunk screw adapted to be screwed into said tapped bore to secure said fitting to said connecting element.

References Cited by the Examiner

UNITED STATES PATENTS

| 706,070 | 8/1902 | Kopp | 20—92 X |
| 735,618 | 8/1903 | Tannewitz | 20—92.7 |
| 2,010,412 | 8/1935 | Parsons | 20—74 X |
| 2,097,172 | 10/1937 | Yurkovitch | 20—92 |
| 2,871,077 | 1/1959 | Mutchnik | 311—110 X |
| 3,011,229 | 12/1961 | Mutchnik | 20—92.7 |

FOREIGN PATENTS

| 144,562 | 2/1936 | Austria. |
| 265,089 | 2/1927 | Great Britain. |

FRANK L. ABBOTT, *Primary Examiner.*

EARL J. WITMER, RICHARD W. COOKE, Jr.,
*Examiners.*

R. A. STENZEL, *Assistant Examiner.*